United States Patent [19]
O'Rourke

[11] 3,755,809
[45] Aug. 28, 1973

[54] RPM CODING AND DECODING APPARATUS THEREFOR

[75] Inventor: Thomas Frank O'Rourke, San Jose, Calif.

[73] Assignee: International Business Machines Corporation, Armonk, N.Y.

[22] Filed: Apr. 5, 1971

[21] Appl. No.: 131,234

[52] U.S. Cl. 340/347 DD, 235/61.11 R, 340/174.1 H
[51] Int. Cl. ............ G06f 5/00
[58] Field of Search ............ 340/167 A, 167 B, 340/170, 347 DD, 174.1 H, 174.1 A, 172.5; 328/109–112; 332/9–11; 325/38, 321; 235/61.11, 154; 329/104–109; 178/66–68

[56] References Cited

UNITED STATES PATENTS

| | | | |
|---|---|---|---|
| 3,387,275 | 6/1968 | Gooding et al. | 340/170 X |
| 3,587,090 | 6/1971 | Labeyrie | 340/347 DD |
| 3,636,317 | 1/1972 | Torrey | 235/61.11 E |

*Primary Examiner*—Charles D. Miller
*Attorney*—Hanifin & Jancin and George E. Roush

[57] ABSTRACT

Magnetic and/or optic manifestations of retrospective pulse modulation coding having the important advantage of asynchronous data reduction is enhanced for ultimate utilization in synchronous data processing systems by electronic clocking signal deriving circuitry assembled from conventional logical circuit elements. Where some foreknowledge of the data bit rate is available, the jitter tolerance can be improved to 25 percent. A strobe pulse train, generated in conventional fashion, is applied to a timeout circuit having a period of the order of 1.5 baudel or the minimum spacing of the manifestations. A binary reciproconductive circuit, a "binary flip-flop" circuit for example, is enabled by the timeout circuit and triggered by the strobe pulses for pegging the state of the waveform of the preceding manifestation. The states of the waveform at the two comparison time points necessary in RPM decoding are compared, by a logical exclusive OR gating circuit for example. Another binary reciproconductive circuit at the output of the exclusive OR gating circuit preferably is used for regnerating the data signal.

3 Claims, 6 Drawing Figures

INVENTOR
THOMAS F. O'ROURKE
BY George E Roush
ATTORNEY

RPM CODING AND DECODING APPARATUS THEREFOR

The invention is related to the retrospective pulse modulation systems disclosed and claimed in the copending U.S. patent application, Ser. No. 31,959 of Ernie George Nassimbene filed on the 27th day of Apr. 1970 for "Retrospective Pulse Modulation and Apparatus Therefor" now U.S. Pat. No. 3,708,748 and to the copending U.S. patent application, Ser. No. 102,722 of John Earle Jones filed on the 30th day of Dec. 1970 for a "Method of Representing Data Codes with Equal Width Bar and Device for Reading Same" now U.S. Pat. No. 3,701,886.

The invention relates to digital data recording and reproducing arrangements, and it particularly pertains to the reproduction of digital data by optic and magnetic-to-electric signal transducers from printed optical and/or magnetic record media, although it is not limited to the same.

One of the primary advantages of retrospective pulse bar coding arrangements is the inherent adaptibility to scanning rate whereby a wide range of velocities and accelerations of the reproducing device in passing over the record medium are tolerated without loss of data as set forth in the above-mentioned copending U.S. patent application, Ser. No. 31,959.

Because of this primary advantage RPM coding is being applied to data printed in conventional printing ink and/or to data printed and encoded in conventional magnetic media for reproduction by hand scanning optical sensing apparatus, by hand scanning magnetic sensing apparatus and by relatively low speed magnetic sensing machines. In many of these applications, the velocity of the sensing device relative to the record medium is virtually unknown, and therefore the clocking pulse train must be totally derived from the coded data. In this mode the jitter tolerance, that is the maximum allowable deviation in actual time of occurrence with respect to the expected or ideal time of occurrence of a manifestation, is but 10 percent. The larger the value in percentage the better is the coding in tolerating jitter; the theoretical maximum is 50 percent as should be evident according to the definition above. A low value of 10 percent is not a serious limitation with manual scanning arrangements but a jitter tolerance of 25 percent is greatly desired in many applications, especially those in which slow speed machine sensed data is thereafter routed to synchronous data processing systems wherein code compatibility is of considerable advantage.

Prior art considerations of bar coding and/or synchronization problems bearing on the inventive concept is reflected in the following U.S. Pat. Nos.:

| | | | |
|---|---|---|---|
| 2,612,994 | 10/1952 | Woodland et al. | 209-111 |
| 3,020,526 | 2/1962 | Ridler et al. | 340-174.1 |
| 3,129,385 | 4/1964 | Maestre | 325-38 |
| 3,142,806 | 7/1964 | Fernandez | 329-107 |
| 3,191,058 | 6/1965 | Stone | 307-88.5 |
| 3,212,014 | 10/1965 | Wiggins et al. | 329-107 |
| 3,217,183 | 11/1965 | Thompson et al. | 307-88.5 |
| 3,312,894 | 4/1967 | Blake et al. | 324-68 |
| 3,413,447 | 11/1968 | LaMers | 235-61.6 |
| 3,417,234 | 12/1968 | Sundblad | 235-61.11 |
| 3,448,290 | 6/1969 | Newcomb | 307-234 |
| 3,474,234 | 10/1969 | Rieger et al. | 235-61.11 |
| 3,492,660 | 1/1970 | Halverson | 340-173 |
| 3,506,848 | 4/1970 | Beurrier | 307-234 |
| 3,521,084 | 7/1970 | Jones | 302-232 |
| 3,548,374 | 12/1970 | Vaccaro | 340-146.3 |
| 3,548,377 | 12/1970 | Vaccaro | 340-146.3 |

And in the technical literature:

E. G. Nassimbene, "Voicing Detector," Mar. 1965, pp. 923–4, IBM Technical Disclosure Bulletin, Vol. 7, No. 10;

E. L. Gruenberg, Handbook of Telemetry and Remote Control, 1967, McGraw-Hill, Chapter 13, pp. 20–24; G. A. Hellworth & G. D. Jones, "Push-Pull Feedback Delta Modulator," Dec. 1968, pp. 877–8, IBM Technical Disclosure Bulletin, Vol. 11, No. 7. A. H. Ett and A. Fagg, "Delta Distance Encoding by Digits," Sept. 1970, pp. 991–2 IBM Technical Disclosure Bulletin, Vol. 13, No. 4.

The above listed patents to Woodland and Silver; to La Mers; to Rieger, Kern and Utzinger; and to Halverson, and the publications of Gruenberg; and Ett and Fagg are directed to bar coding systems and/or labels of the prior art. The first three are concerned with pulse width coding arrangements which may appear at first glance to be closely similar to the coding of the invention but which bear no retrospective nature as will be brought out. The patent to Halverson is directed to a color bar coding scheme which has no retrospective nature. The Fagg-Ett, Al publication is directed to RPM Coding having a choice in start and reference mark timing but which coding is critical as to intercharacter chaining in contradistinction to the coding of the invention as will be seen hereinafter.

The remaining patents and publications listed are directed mainly to devices and/or circuitry which may appear closely similar to that of the invention, but are for reading tags and labels of these and other pulse width type codes and/or demodulating waveforms of similar modulation but having no retrospective nature as will develop. The Fagg-Ett, Al publication does demodulate RPM coding but is directed to the handling of a coding having the choice of start and reference mark timing and in no way handles the novel intercharacter gap of the coding and circuitry of the invention as will be shown.

The objects referred to indirectly hereinbefore and those that will appear as the specification progresses are attained in a method of coding and apparatus for demodulating a series of discrete manifestations spaced for representing data in asynchronous or otherwise non-uniform spacing of manifestations for conveying information. In one embodiment according to the invention, each character of binary data, comprising naughts and units, is represented in a series of alternating regions of contrasting characteristics having transitions therebetween spaced in progression as the data is arranged. For example, an initial region of a given characteristic having start and reference transitions is established and succeeding transitions between regions carry the data. One binary character, for example, the binary unit, or number 1, is thereafter manifested by a transition spaced substantially at the same interval as between the start and reference transitions. A binary naught, or 0 (zero), is then denoted by a further transition following the last transition by an interval different from the spacing between the preceding transitions. Preferably, the difference in spacing between transitions is substantial, for example of the order of 2:1. The final region may be of extent equal to or unequal to the preceding regions, that is it need not be related in extent at all, as it represents an intercharacter gap. Such arrangement is highly advantageous in retrospective pulse modulation (RPM) coding for typewriters and other printing apparatus. A binary unit may be manifested by three transitions in series with equidistant spacing between the succeeding transitions and a binary naught by three transitions appearing in series with a spacing between two of the transitions twice as great as that between one of the previous transitions and the succeeding transitions. The manifestation, or coding, of the binary data, after the start and reference transitions, is on a single transition per character bit but the value or identity of that bit is dependent on the manifestation of the previous value or character bit. Thus, a transition denoting one binary character is established after two succeeding transitions of spacings substantially equal to each other, and the other binary character is effected by a transition occurring after two other transitions spaced by substantially different spacings but without regard to the order of the occurrence of the different spacings or extents of the fields or areas laid down on the recording medium in the form of printed regions, magnetic ink strips, magnetic tape and/or punched apertures in a card. This arrangement is preferred over some prior art arrangements in that the record is somewhat condensed in space and superfluous transitions are eliminated.

In another embodiment to the invention, a basic demodulator for a retrospective pulse modulated signal having a basic manifestation spacing between predetermined parameters comprises a manifestation sensing device followed by a full wave rectification circuit or the equivalents for producing a train of unidirectional electric energy strobe pulses spaced in accordance with the manifestations, a basic timeout circuit, for example a monostable reciproconductive circuit, having an unstable state duration of substantially 1.5 baudel—or minimum bit time—and a pegging binary reciproconductive circuit both triggered by the strobe pulse train and an Exclusive OR (XOR) logical gating circuit or the equivalent coupled to corresponding outputs of the reciproconductive circuits. The method of demodulation according to the invention comprises the comparison of the basic timeout with the actual timeout represented by the strobe pulse with reference to the state of the data waveform at the previous manifestation—as pegged by the binary reciproconductive circuit. Preferably the output signal of the XOR gating circuit is regenerated, as for example by another binary reciproconductive or binary flip-flop circuit triggered by the strobe pulse train.

Other aspects of the invention which are contemplated include arrangements for the sensing of an intercharacter gap, and fixed length code fields in order to effect control and translation to other digital data systems.

In order that full advantage of the invention may be obtained in practice, preferred embodiments thereof, given by way of examples only, are described in detail hereinafter with reference to the accompanying drawing, forming a part of the specification, and in which.

Figure 1:
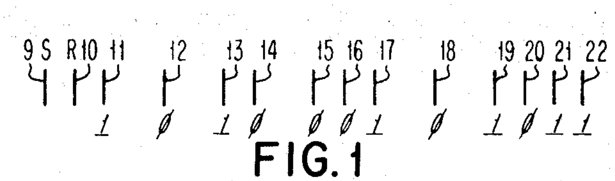
FIG. 1 is a graphical representation of binary information laid down in retrospective pulse modulation format.

The underlying principle of retrospective pulse modulation is illustrated in FIG. 1. Information in the form of a twelve order binary number, 101000101011, is coded in this general example. A series of parallel lines 9–22 can be considered as narrow electric pulses established at time intervals proportional to the spacing between the lines 9–22, or as printed lines or bars for optically manifesting the information desired, or as indications of raised or depressed surfaces manifesting the information for mechanical sensing, or as representations of lines of magnetic dipoles of uniform polarity, or as other manifestations by physical form as will occur to those skilled in the art. A start line or bar 9 is followed at a predetermined spacing by a reference bar 10 for initiating the retrospective modulation. The first information manifesting bar 11 follows the reference 10 by a spacing substantially equal to the spacing between the start bar 9 and the reference bar 10 to manifest a binary unit; obviously a binary naught might be better manifested by this arrangement depending upon the situation facing the designer. The following bar 12 is arranged on the former basis to denote a binary naught by spacing a bar 12 substantially twice the distance from the preceding bar 11 as that bar follows the reference bar 10. The information is carried by the spacing between bars. The binary unit is set down at a time at which the spacing between the two preceding bars 9 and 10 is equal to the spacing between the bars 11 and 10. Unequal spacing of the bar 12 from the preceding bar 11 as compared to the spacing between the reference bar 10 and the bar 11 denotes a naught. A binary unit (1) is next denoted by setting down a bar 13 at twice the spacing from the preceding bar 12 as was arranged between the start bar 9 and the reference bar 10. A bar 14 following the preceding bar 13 at a spacing smaller than the spacing between the preceding pulses 12 and 13 and equal to the spacing between the start bar 9 and the reference bar 10 will denote a binary naught (0); likewise a bar 15 following the preceding bar 14 by a spacing greater than that between the preceding bars 13 and 14 still denotes binary zero as will bar 16 following the bar 15 by a shorter spacing. A binary naught is denoted by a bar 18 following the preceding bar 17 by a spacing greater than the latter bar follows the earlier bar 16. A succeeding bar 19 denotes a binary unit (1) by following the preceding bar 18 by the same larger spacing as bar 18 followed the bar 17. Bars 20, 21 and 22 denote a naught and two units by following the bar 19 at uniform spacing. Thus, FIG. 1 gives an example of each of the possibilities of data manifestation in basic binary digit retrospective pulse modulation where the immediate preceding spacing is reflected in the spacing of the digit under consideration.

In this basic arrangement a timing gap is required at the beginning of each character which reduces the potential character density achievable with given optical resolution, and the fact that the coded length varies depending upon the particular sequence of "1"s and "0"s means that the maximum character density is a function of the "worst length" code for a particular character in the set. The resolution $R$ (per unit length) required for a given character density $D$ (characters per unit length) is relatively high, being $$R=(0.5)\,(1)\,(1)/(N)\,(D)$$

where $N$= the number of bit spaces, including timing, required to encode the worst case character in the set. For a full Fortran set, $N$=10 and therefore $$R=0.05./D$$

Figure 2:
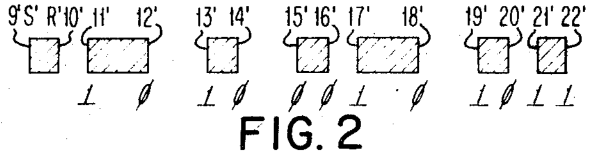
FIG. 2 is a graphical representation of the same binary information manifested in a different manner according to the invention.

In FIG. 2 the same binary data is manifested by the transitions between highly contrasting white and black areas. Reproducing apparatus, such as an optical scanning device, is passed over the printed field from a point before the starting edge 9' to a point beyond the final edge 22'. An electric pulse signal is developed at each transition from white to black (9', 11', 13' . . . 17', 19' and 21') and again from black to white (10', 12', 14' . . . 18', 20' and 22'). Preferably a differentiating process is involved in either case. Each differential pulse is significant with respect to the data in the latter case whereas alternate pulses are not in the case of the first example. This difference is of immediate importance in increasing the density of the coded data and in the elimination of superfluous pulses in the data signal which may interfere as though spurious. In this modified arrangement it is necessary to add an "intercharacter gap" of one bit space to separate the last dark bit space from the first dark bit space of the next character.

This intercharacter gap affords the ability to encode by printing a whole character on each impression (as on a typewriter or as arranged in a linotype machine, for example) without requiring close character to character (escapement) tolerance as with an intercharacter digit of the copending art. With such an intercharacter gap, the improvement (in terms of required optical resolution) is obvious by the increase in the value of $R$.

$$R=(1.0)\,(1)/(N+1)\,(1)/(D)$$

For a full Fortran set, $N$=10 and therefore $$R=0.091./D$$

Since reliability in reading is area-sensitive, the 82 percent improvement in one dimension yields a total improvement of 330 percent. This coding technique is a change in technique rather than a different code. The change is somewhat analogous to the difference between NRZ and NRZI in magnetic encoding.

The code format shown and described in the copending U.S. patent application, Ser. No. 102,722 abovementioned and similar formats are of interest at this point. In these formats no timing bit is necessary, and each character has a code field of the same length. A "1" bit is simply defined as being a field 1/X dark & (X−1)/X white and a "0" bit is defined as being a field (X−1)/X dark & 1/X white. No intercharacter gap is required since a character always ends with a white field and starts with a dark field. The resolution required to interpret this type of code is, for example where $X$=3, $$R=(0.33)\,(1)/(M)\,(1)/(D)$$

For a full Fortran set, $M$=6 and therefore $$R=0.055/D$$

Though this type of format is not significant from a resolution point of view, it does have several other advantages. First, it is possible to use integration techniques to demodulate it, rather than relying on peak detection which is very noise susceptible, and there are no "garbage" or meaningless bits between characters. Thus there is some savings in the cost of the processing electronics. Because the major technical problems faced in the development of hand scanning apparatus reside in those aspects involving resolution the coding format shown in FIG. 2 is the best to date.

A complete commercial type family which has been embodied in a type "element" for a multiaxis printing element assembly such as found in the commercially available IBM Selectric typewriter is given in Table I below.

TABLE I

| | | | | | | | | | | | | | |
|---|---|---|---|---|---|---|---|---|---|---|---|---|---|
| A | B | C | D | E | F | G | H | I | J | K | L | M | N |
| M | N | O | P | Q | R | S | T | U | V | W | X | Y | Z |
| 1 | 2 | 3 | 4 | 5 | 6 | 7 | 8 | 9 | 0 | | | | |
| — | $ | ■ | → | ← | , | . | / | | | | | | |
| | | # | * | @ | | | | | | | | | |

The bar coded characters are identified by the corresponding symbol immediately below and only the three characters above the lowermost symbols # ,*,@ and require any explanation. The dark square above the accountant's number symbol # denotes a blank as used in many computing systems where such is necessary. The dexter arrow above the asterisk * is used where a "start-of-message" (SOM) character is required and the sinister arrow above the accountant's extension symbol @ is used where an "end-of-message" (EOM) character is necessary. This character is sensed for a carriage return signal in page printing data output apparatus.

A typical message format is given in Table II below.

TABLE II

→THE■STOCK■NUMBER■IS←

→5F317■248—J ,AND THE←

→PRICE IS $6.95/PAIR.←

The latter table is self explanatory, but it might be mentioned that in many printout systems the "blank" symbol will be suppressed in printing only as shown in the final clause of the sentence.

Table II also illustrates the intercharacter gap feature according to the invention. In basic RPM the penultimate and ultimate manifestations or transitions of each character become the start and reference transitions of the succeeding character. A single "drop out" or "fill in" destroys the remaining data. The intercharacter digit of the copending U.S. patent application Ser. No. 102,722 lengthens the message by two bits for each character and still requires uniform tolerance between characters as well as between data transitions. The RPM coding according to the invention does have the effect of adding one bit per character but it eliminates the requirement for tight tolerance between characters. This relief is especially important in any typewriter or linotype apparatus. A gap of ±12 mils tolerance has been found allowable in a typewriter application. In many applications the gap spacing can be entirely unrelated to the spacing of the data having transitions. Fixed length characters and transition counting circuitry are entirely suitable for many decoding arrangements. On the other hand the gap may be made significantly different, preferably greater, from the transition spacing and sensed by a conventional gap detection circuitry. A timeout circuitry of 3 baudels duration and conventional logic circuitry is adequate for many applications. This relieves the necessity for uniform length characters without adding substantially to the overall circuitry.

Figure 3:
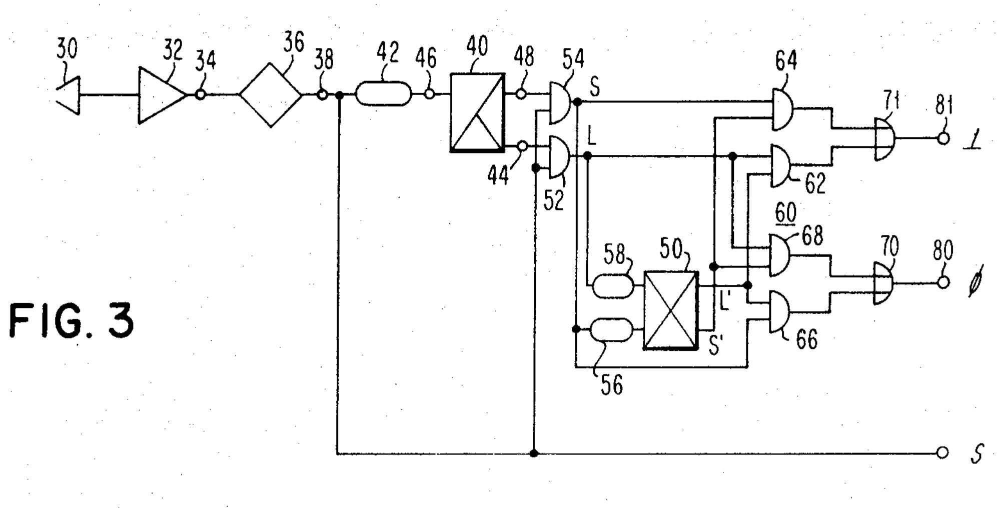
FIG. 3 is a functional logic diagram of a basic retrospective pulse demodulator according to the invention.

A logical functional diagram of a circuit for demodulating the aforementioned coding is shown schematically in FIG. 3. A sensing device, shown here as a magnetic transducer 30, and an associated amplifying circuit 32 of conventional form deliver an electric signal at terminals 34. A signal translating circuit 36 modifies the signal as required and the modified signal is delivered at terminals 38. In the arrangement as shown the electric signal at the terminals 34 comprises a pulsating waveform bipolar in nature and evidencing the differentiating process inherent in conventional magnetic transducing and amplifying operations. The signal translating circuit 36 preferably is a full wave rectifying circuit of conventional configuration for supplying a train of unidirectional pulses at the terminals 38 representative of data encoded as described. This pulse train is normally adequately shaped for application as a strobe pulse train; a conventional signal shaping circuit can be used if desired or necessary.

According to the invention the strobe pulse train is applied to the input terminals of a timeout circuit 40 by way of a delay circuit as shown. The timeout circuit is arranged to deliver one gating level at an output terminal 44 in the absence of any strobe pulse at the input terminal 46 and to deliver a similar gating level at the complementary output terminal 48 in response to a triggering strobe pulse. This latter output gating level will be maintained for a period of the order of 1.5 times the minimum data bit or baudel spacing after the last applied strobe pulse even after that strobe pulse ceases to exist at the input terminal 46. A pegging bilateral reciproconductive circuit 50 is arranged to follow the timeout circuit 40 at strobe pulse time as will be seen.

Because of the gross inconsistency with which the terminology relating to the many types of "multivibrators" and similar circuits is used, the less frequently but much more consistently used term "reciproconductive circuit" will be used hereinafter as the basis for interpreting the terminology defining the invention. As employed herein, the term "reciproconductive circuit" is construed to include all dual current flow path element (including vacuum tubes, transitors and other current flow controlling devices) regenerative circuit arrangements in which current flow alternates in one and then the other of those elements in response to applied triggering impulses and/or pulses. The term "free running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energizing voltage. The term "monostable flip-flop circuit" will be used to indicate such a reciproconductive circuit as the timeout circuit 40 in which a single trigger is applied to a single input terminal to trigger the reciproconductive or flip-flop circuit to the unstable state once and return. This monostable version is sometimes called a "single-shot circuit" in the vernacular principally because of the erosion of the original term "flip-flop" and because it is shorter than the term "self-restoring flip-flop circuit" later used in an attempt to more clearly distinguish from the term "bistable flip-flop circuit" even more lately in vogue. "Bistable reciproconductive circuits" are divided into two basic circuits. One is the "bistable reciproconductive circuit" having two input terminals between which successive triggers must be alternately applied to switch from one stable state to the other, as the pegging circuit 50, will be referred to as a "bilateral reciproconductive circuit." This version is loosely called both a "flip-flop" and a "lockover circuit." The other is the "binary reciproconductive circuit" which has one input terminal to which triggering pulses are applied to alternate the state of conduction each time a pulse is applied. The other pegging circuit 50' is one such circuit. Such a circuit is now frequently referred to as a "binary flip-flop" circuit and will so be referred to hereinafter.

The monostable reciproconductive or flip-flop timeout circuit 40 in its normal state arms an AND gating circuit 52. The latter AND gating circuit 52 is enabled at strobe pulse time by a strobe pulse from the data signal input terminal 38. During the timeout operation a similar AND gating circuit 54 is armed ready for enablement by a strobe pulse. Delay circuits 56 and 58 couple the AND gating circuits 52 and 54 individually to the input terminals of the pegging circuit 50. The latter circuit is switched to reference the logic circuitry to the previous manifestation as will be seen. Further logic circuitry comprises a cluster 60 of logical AND gating circuits 62, 64, 66 and 68 for determining whether the baudel or data bit under consideration is a binary unit (1) or a naught (0) in response to the operation of the timeout circuit 40 and of the pegging circuit 50. The AND gating circuit 62 is connected to the stable output terminal of the timeout circuit 40 and to the output terminal of the pegging circuit, raised by the AND gating circuit 52 indicating a baudel spacing greater than the timeout period. Thus the output of the AND gating circuit denotes binary unit value (1) when it is raised. Similarly the AND gating circuit 64, being connected to the other output terminal of the pegging circuit and the AND gating circuit 54, also denotes a binary unit value (1) based on equal spacings less than the timeout period. Correspondingly, the AND gating circuits 66 and 68, being connected in the other combinations of possible connection to the pegging and timeout circuits, denote binary naught values (0) based on unequal baudel spacings. The latter AND gating circuits are connected to an OR gating circuit 70 and the AND gating circuits 62 and 64 are connected to an OR gating circuit 71. In this arrangement strobe pulses are available at strobe terminals 78 and binary naught signals are avilable at terminals 80 and binary unit signals at terminals 81 for utilization in succeeding circuitry in conventional manner.

The operation of the circuitry improves the jitter tolerance by avoiding the accumulation of individual tolerances. In the case of an RPM coded binary unit, or 1, the spacing between the first and second transitions ideally occurring at times $t_1$ and $t_2$ is equal to the spacing between the second and third transitions occurring at times $t_2$ and $t_3$; that is:

$$t_2 - t_1 = t_3 - t_2 \tag{1}$$

If the maximum bit shift is d:

$$t_2 - t_1 - 2d = 2/3(t_3 - t_2 + 2d) \tag{2}$$

but $t_2 - t_1 = t_3 - t_2 = 1$ baudel from (1) (3)
therefore from (2)

$$d = (0.10) \text{ baudel} \tag{4}$$

In the synchronous decode implementation, $$t_2 - t_1 + 2d = 1.5\ (t_2 - t_1) \tag{5}$$

and, since $t_2 - t_1 = 1$ baudel, $$d = (0.25) \text{ baudel)} \tag{6}$$

Figure 4:
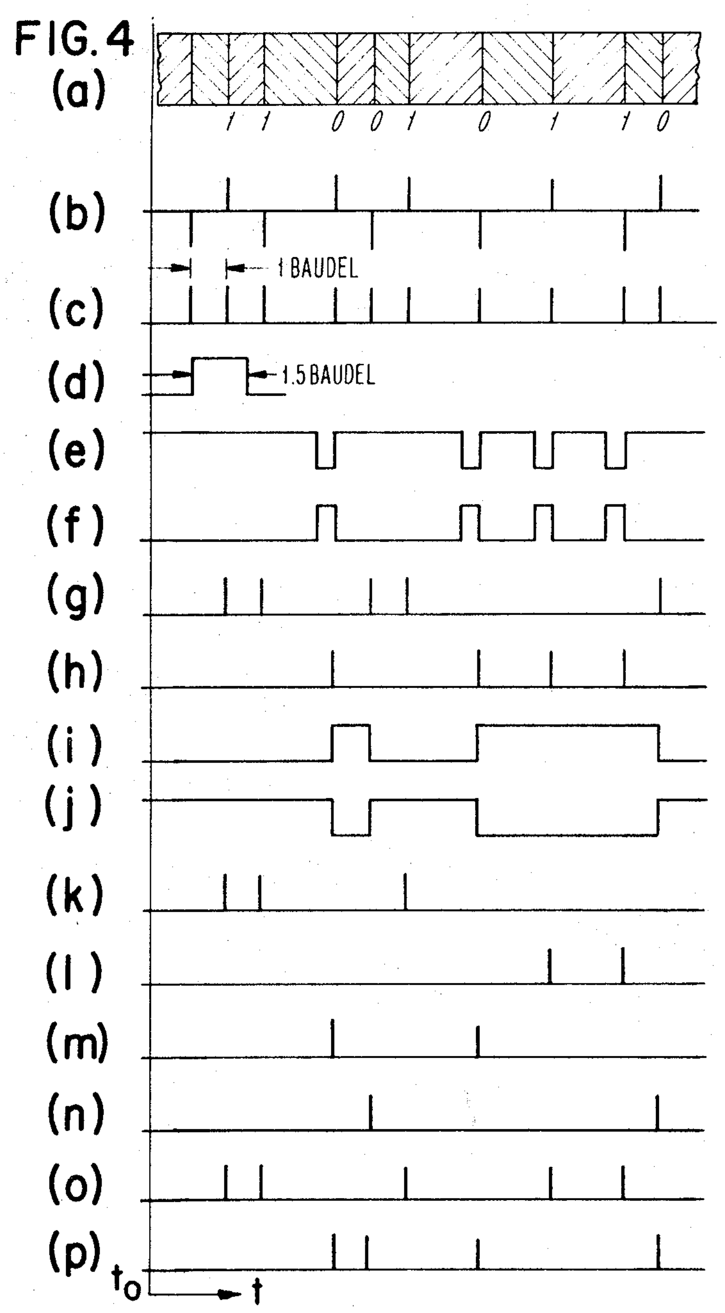
FIG. 4 is a graphical representation of waveforms useful in understanding the functioning of the apparatus illustrated in FIG. 3.

A timing wave diagram for the illustrated demodulator circuitry is shown in FIG. 4. FIG. 4(a) there is a graphical representation of binary data recorded in a printed magnetic stripe or on a length or magnetic tape in RPM coding. The detected signal at the terminals 34 is represented in FIG. 4(b) and the resulting rectification at the terminals 38 is shown in the curve of FIG. 4(c) which is a representation of the strobe pulse train as well. One cycle of the basic timeout level is shown by the curve of FIG. 4(d) for time period comparison with the strobe pulse train. The output wave at the terminal 48 of the timeout circuit 40 for the data in the example is shown by the curve of FIG. 4(e) while the wave at the complementary terminal 44 is shown by the curve of FIG. 4(f). The output of the AND gating circuit 54 is shown in the curve of FIG. 4(g) and the counterpart at the AND gating circuit 52 is represented by the curve of FIG. 4(h). The corresponding outputs of the pegging circuit 50 are given FIGS. 4(i) and 4(j) respectively. The output pulses from the AND gating circuits 64, 62, 68, and 66 are shown in FIGS. 4(k), 4(l), 4(m) and 4(n) respectively. The output signal trains at the units terminal 81 and the naughts terminal 80 are shown by the curves of FIGS. 4(o) and 4(p) respectively.

The curves are idealized for clarity in the understanding of the operation of the circuitry as though the delay circuits 42, 56 and 58 presented zero time delay. In practice a small amount of delay is preferable in order to prevent the strobe pulses from being lost in the gating waves and therefore ineffective. A time dealy of 0.1 the data bit or baudel spacing has been found sufficient.

Figure 5:
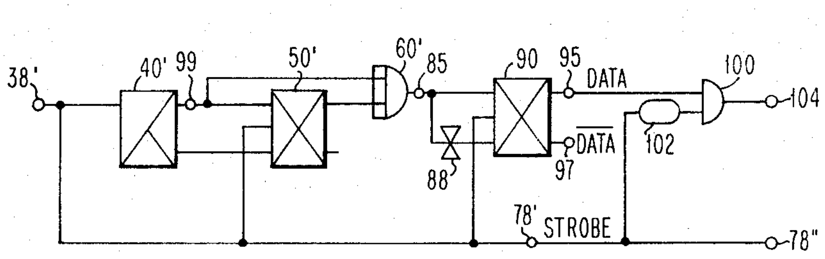
FIG. 5 is a functional logic diagram of an alternate RPM demodulator according to the invention.

A more sophisticated demodulating circuit is illustrated in the functional diagram of FIG. 5. The data signal and strobe pulse train appear at the terminals 38 as before. The timeout circuit 40' is functionally equivalent to the timeout circuit 40. The pegging circuit 50' differs in that it is essentially a binary reciproconductive or flip-flop; and circuit. With this arrangement delay circuits are unnecessary because there are no gating circuits involved up to this point. Evaluation of the RPM coded data is performed by an exclusive OR (XOR) gating circuit 60' and the output terminals 85 deliver the demodulated output data. Preferably this demodulated data is regenerated by the following inverting circuit 88 and binary reciproconductive or flip-flop circuit 90 in more or less conventional manner. The regenerated data is obtained at data terminals 95 and the inverted wave at the other terminals 97. An AND gating circuit 100 and a time delay circuit 102 must be used for obtaining a pulse output train for 0 values at output terminals 104. A similar train for 1 values may be had by ANDing the inverted data at the terminals 97. Alternately the AND gating circuit 100 may be connected to the output terminals 85 where regeneration of the data wave is unnecessary.

Figure 6:
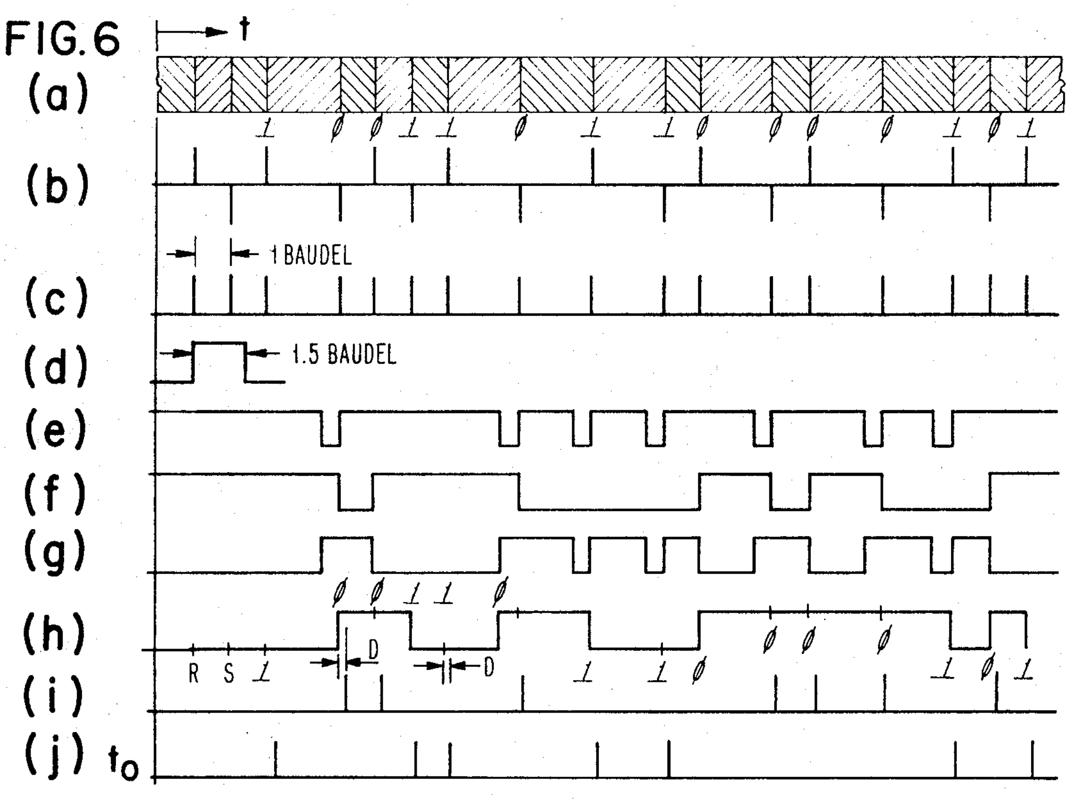
FIG. 6 is a graphical representation of waveforms useful in understanding the functioning of the demodulating apparatus shown in FIG. 5.

FIG. 6 is a representation of waveforms useful in the understanding of the latter demodulating circuitry.

FIG. 6(a) represents another magnetic stripe or length of magnetic tape as having a binary message recorded thereon. FIG. 6(b) represents the signal derived by a conventional magnetic tape signal reproducing system operating on the length of magnetic tape as depicted. After full wave rectification the signal appears as in FIG. 6(c). Each of the pulses in this waveform corresponds in time and/or space to the transitions in the tape magnetization which were recorded by RPM coding techniques. Each pulse occurs at a point at which determination is made in evaluating data and therefore is also defined as a strobe pulse. FIG. 6(d) provides a comparison of one unstable period of the timeout circuit 40' with the train of strobe pulses. In the method of decoding for improving the jitter tolerance, the strobe signal train is applied to the timeout circuit 40', resulting in the waveform of FIG. 6(e) at the output terminal 99. The output of the pegging circuit 50' which is required to store the state of the wave form from point to point for RPM decoding is shown by the curve in FIG. 6(f). The circuit 50' is enabled by the output of the time out circuit 40 and triggered by the strobe pulse train at the terminal 38'. Comparison of the succeeding transition pulse times is accomplished by the XOR circuit 60'. The output data wave at the terminals 85 is represented by the curve in FIG. 6(g). This data wave can be used directly in conjunction with the strobe pulse train at the terminals 78'. These waveforms are ideal as shown. In actual practice some distortion will enter. Conventional regenerating techniques are applicable. One such regenerated waveform at the output of the flip-flop circuit 90 is represented by the curve in FIG. 6(h). The curves in FIGS.

6(i) and 6(j) represent the output at the terminals 104 when the AND gating circuit 100 is connected to the regenerator terminals 95 and 97 respectively. The delay element 102 need have a delay D only long enough (0.1 baudel is satisfactory) to present the strobe pulse after any potential transition as shown. The output can be converted to the NRZI format by the addition of a conventional latch circuit. Conversion of the decoded data to other data handling formats can be effected as required.

Because the strobing is aperiodic, conventional buffering arrangements will be used in many systems by those skilled in the art.

While the invention has been shown and described particularly with reference to preferred embodiments thereof, and various alternative structures have been suggested, it should be clearly understood that those skilled in the art may effect further changes without departing from the spirit and scope of the invention as defined hereinafter.

The invention claimed is:

1. A retrospective pulse modulation code demodulating circuit arrangement comprising retrospective pulse modulated data wave input terminals, a monostable flip-flop circuit having input terminals coupled to said data wave input terminals and having erect and inverted level output terminals, a binary flip-flop circuit having enabling input terminals individually coupled to said output terminals of said monostable flip-flop circuit, having binary input terminals connected to said data wave input terminals and having output terminals, an XOR gating circuit having input terminals connected to corresponding output terminals of said monostable and said binary flip-flop circuits and having output terminals at which appear potentials representative of the data in said wave.

2. A retrospective pulse modulation code demodulating circuit arrangement as defined in claim 1 and incorporating a further binary flip-flop circuit having enabling input terminals connected to the output terminals of said XOR gating circuit and binary input terminals connected to said data wave input terminals and having output terminals at which the data is regenerated.

3. A retrospective pulse modulation code demodulating circuit arrangement as defined in claim 1 and incorporating an AND gating circuit having one input lead coupled to said XOR gating circuit, another input lead connected through a time delay circuit to said data wave input terminals and having output terminals at which a pulse wave of one binary value is delivered.

* * * * *